United States Patent
Thompson et al.

(10) Patent No.: US 8,150,595 B2
(45) Date of Patent: Apr. 3, 2012

(54) METHOD FOR TORQUE MANAGEMENT IN A HYBRID VEHICLE EQUIPPED WITH ACTIVE FUEL MANAGEMENT

(75) Inventors: Scott J Thompson, Waterford, MI (US); Michael J. Pitsch, Ann Arbor, MI (US); Goro Tamai, West Bloomfield, MI (US)

(73) Assignee: GM Global Technology Operations LLC

( * ) Notice: Subject to any disclaimer, the term of this patent is extended or adjusted under 35 U.S.C. 154(b) by 532 days.

(21) Appl. No.: 12/401,205

(22) Filed: Mar. 10, 2009

(65) Prior Publication Data

US 2010/0042279 A1     Feb. 18, 2010

Related U.S. Application Data

(60) Provisional application No. 61/089,288, filed on Aug. 15, 2008.

(51) Int. Cl.
*B60K 6/24* (2007.10)
(52) U.S. Cl. ................... 701/102; 903/905; 180/65.28
(58) Field of Classification Search .............. 701/102; 903/905; 180/65.28; *B60K 6/24*
See application file for complete search history.

(56) References Cited

U.S. PATENT DOCUMENTS

| | | | |
|---|---|---|---|
| 7,232,401 B2 | 6/2007 | Albertson | |
| 2005/0000479 A1* | 1/2005 | Niki et al. | 123/90.15 |
| 2005/0003925 A1* | 1/2005 | Wakashiro et al. | 477/2 |
| 2005/0010353 A1* | 1/2005 | Matsubara et al. | 701/103 |
| 2005/0011690 A1* | 1/2005 | Bhavsar et al. | 180/65.2 |

* cited by examiner

*Primary Examiner* — Mark Hellner
*Assistant Examiner* — Ari M Diacou

(57) ABSTRACT

A control method for a hybrid powerplant includes receiving a pre-transition signal, and selectively adjusting a combustion torque of an engine of the powerplant between a first torque value and a second torque value prior to a deactivation transition period based on the pre-transition signal, wherein the second torque value is less than the first torque value. The method further includes selectively adjusting an electric drive torque of an electric machine of the powerplant prior to the deactivation transition period based on the pre-transition signal and the combustion torque. The selectively adjusting the electric drive torque includes adjusting the electric drive torque such that a sum of the combustion torque and the electric drive torque is equal to a desired drive torque of the powerplant during a pre-transition period prior to the deactivation transition period. A related control system is also provided.

20 Claims, 4 Drawing Sheets

METHOD FOR TORQUE MANAGEMENT IN A HYBRID VEHICLE EQUIPPED WITH ACTIVE FUEL MANAGEMENT

CROSS-REFERENCE TO RELATED APPLICATIONS

This application claims the benefit of U.S. Provisional Application No. 61/089,288, filed on Aug. 15, 2008. The disclosure of the above application is incorporated herein by reference.

FIELD

The present disclosure relates to control of a motor vehicle, and more particularly, to control systems and methods for controlling drive torque produced by a hybrid powerplant of the vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that includes a powerplant, such as an internal combustion engine, a multispeed transmission, and a differential or final drive train. The powerplant produces drive torque that is transmitted through one of various gear ratios of the transmission to the final drive train to drive wheels of the vehicle.

As an alternative to the internal combustion engine, automotive manufacturers have developed hybrid electric vehicles (HEVs). The hybrid powertrains of the HEVs may include both an electric drive system and an internal combustion (IC) engine that produce drive torque. During operation, HEVs use one or both of the power sources to improve efficiency.

The HEVs may use either a parallel drivetrain configuration or a series drivetrain configuration. In the parallel HEV, the electric drive system works in parallel with the IC engine to combine the power and range advantages of the IC engine with the efficiency and the electrical regeneration capability of the electric drive system. In the series HEV, the IC engine drives a generator to produce electricity for the electric machine, which drives a transaxle. This allows the electric machine to assume some of the power responsibilities of the IC engine, thereby permitting the use of a smaller and more efficient engine.

In both configurations, the electric drive system stores energy in batteries and uses the stored energy to power the vehicle. The HEV may shut down the IC engine when the vehicle is stopped or idling. On takeoff, the electric drive system may propel the vehicle and eventually restart the IC engine. The electric drive system stores braking energy in the batteries during regenerative braking.

The hybrid powertrain may be regulated by an electronic control system that includes one or more control modules. The control system may include an active fuel management (AFM) system that deactivates cylinders of the IC engine under low and/or moderate load conditions. For example, where the IC engine is provided with eight cylinders, the IC engine can be operated using four cylinders to improve fuel economy by reducing pumping losses.

As used herein, an activated mode refers to AFM operation using all of the engine cylinders. A deactivated mode refers to AFM operation using less than all of the cylinders of the IC engine (i.e. one or more cylinders are not active). A deactivation transition mode refers to a transition from the activated mode to the deactivated mode. An activation transition mode refers to a transition from the deactivated mode to the activated mode.

Transitions between the activated and deactivated modes may cause momentary drive torque disturbances that may be perceived by the driver and degrade the driving experience. For example, excess drive torque during the transitions may cause engine surge and insufficient torque may cause engine sag, both of which degrade the driving experience.

Conventional spark retard techniques have been used to compensate for the excess drive torque during the transitions. Retarding the spark delays the time to peak cylinder pressure which reduces the drive torque output of the IC engine. Additionally, techniques using the electric drive system have been used to smooth the drive torque disturbances occurring during the transitions by selectively generating or absorbing drive torque.

SUMMARY

This section provides a general summary of the disclosure, and is not a comprehensive disclosure of its full scope or all of its features.

In one form, the present disclosure provides a control system for a hybrid powerplant that includes an input that receives a pre-transition signal, and a torque management module that selectively adjusts a combustion torque of an engine of the powerplant between a first torque value and a second torque value prior to a deactivation transition period based on the pre-transition signal, wherein the second torque value is less than the first torque value. In one feature, the torque management module adjusts the combustion torque to the second torque value. In another feature, the second torque value is based on one of the first torque value and an estimated combustion torque of the engine in a deactivated mode. In a related feature, the estimated combustion torque is one of a desired torque and a maximum torque of the engine in the deactivated mode.

In an exemplary implementation, the torque management module selectively adjusts a manifold pressure of the engine between a first manifold absolute pressure (MAP) value corresponding to the first torque value and a second MAP value corresponding to the second torque value. In a related feature, the torque management module selectively increases the manifold pressure during the deactivation transition period.

In further features, the torque management module selectively adjusts an electric drive torque of an electric machine of the powerplant prior to the deactivation transition period based on the pre-transition signal. In related features, a displacement module generates the pre-transition signal based on a desired drive torque of the powerplant. In another related feature, during a pre-transition period prior to the deactivation transition period, the torque management module adjusts the electric drive torque such that a sum of the combustion torque and the electric drive torque is equal to the desired drive torque. In yet another related feature, during the deactivation transition period, the torque management module selectively increases the combustion torque and adjusts the electric drive torque such that the sum is equal to the desired drive torque. In still other related features, the torque management module selectively adjusts power supplied to the electric machine by a battery, and the second torque value is based on one of a stored energy of the battery and a temperature of the battery.

In another form, the present disclosure provides a control method for a hybrid powerplant that includes receiving a pre-transition signal, and selectively adjusting a combustion torque of an engine of the powerplant between a first torque value and a second torque value prior to a deactivation transition period based on the pre-transition signal, wherein the second torque value is less than the first torque value. In one feature, the selectively adjusting includes adjusting the combustion torque to the second torque value. In another feature, the second torque value is based on one of the first torque value and an estimated combustion torque of the engine in a deactivated mode. In a related feature, the estimated combustion torque is one of a desired torque value and a maximum torque value of the engine in the deactivated mode. The selectively adjusting may include adjusting a manifold pressure of the engine between a first MAP value corresponding to the first torque value and a second MAP value corresponding to the second torque value.

In further features, the method includes selectively adjusting an electric drive torque of an electric machine of the powerplant prior to the deactivation transition period based on the pre-transition signal and the combustion torque. In a related feature, the method includes generating the pre-transition signal based on a desired drive torque of the powerplant. In another related feature, the selectively adjusting the electric drive torque includes adjusting the electric drive torque such that a sum of the combustion torque and the electric drive torque is equal to the desired drive torque during a pre-transition period prior to the deactivation transition period.

In still further features, the method includes selectively increasing the combustion torque during the deactivation transition period, and adjusting the electric drive torque during the deactivation transition period such that the sum is equal to the desired drive torque. In yet further features, the selectively adjusting the electric drive torque includes selectively adjusting power supplied to the electric machine by a battery, and the second torque value is based on one of a stored energy of the battery and a temperature of the battery.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
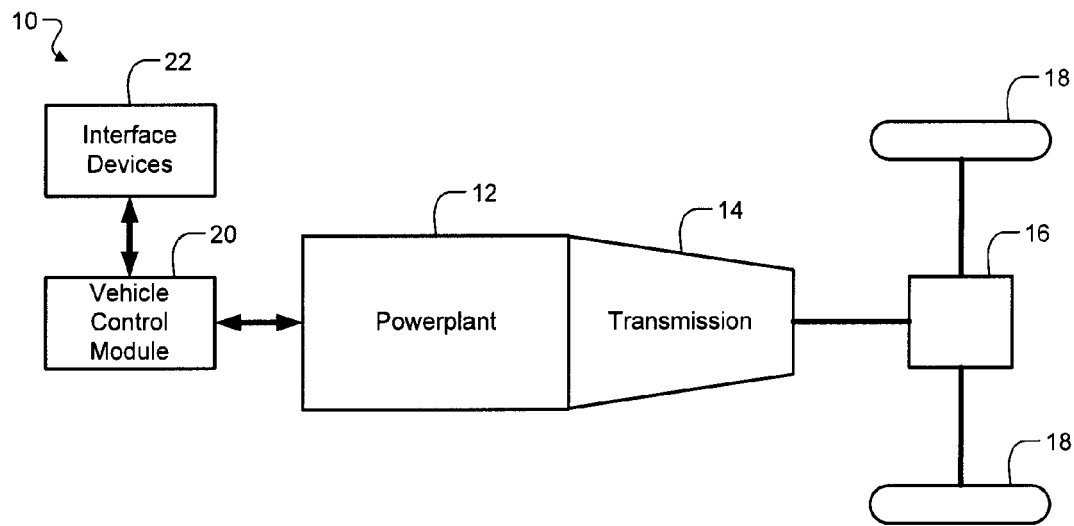
FIG. 1 is a functional block diagram illustrating an exemplary hybrid vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In a hybrid vehicle equipped with an AFM system, disturbances in the desired drive torque that may occur during a deactivation transition to a deactivated mode may be reduced by decreasing a manifold air pressure of an IC engine prior to the deactivation transition. By decreasing the MAP prior to the deactivation transition, combustion drive torque produced by the IC engine at the onset of the deactivation transition may be decreased. The difference between a desired drive torque and the combustion drive torque that may result from decreasing the MAP may be compensated for by increasing an electric drive torque produced by an electric drive system. During the deactivation transition, the MAP may be increased and the electric drive torque decreased to smoothly achieve the desired combustion drive torque in the deactivated mode.

With particular reference to FIG. 1, an exemplary hybrid vehicle 10 according to the principles of the present disclosure is shown. The vehicle 10 may include a hybrid powerplant 12 that produces drive torque that is transmitted through one or more gears of a transmission 14 to a drivetrain 16 to drive wheels 18. The vehicle 10 may further include a vehicle control module (VCM) 20 that regulates operation of the powerplant 12 based on signals received from various driver interface devices 22 (e.g., accelerator pedal).

Figure 2:
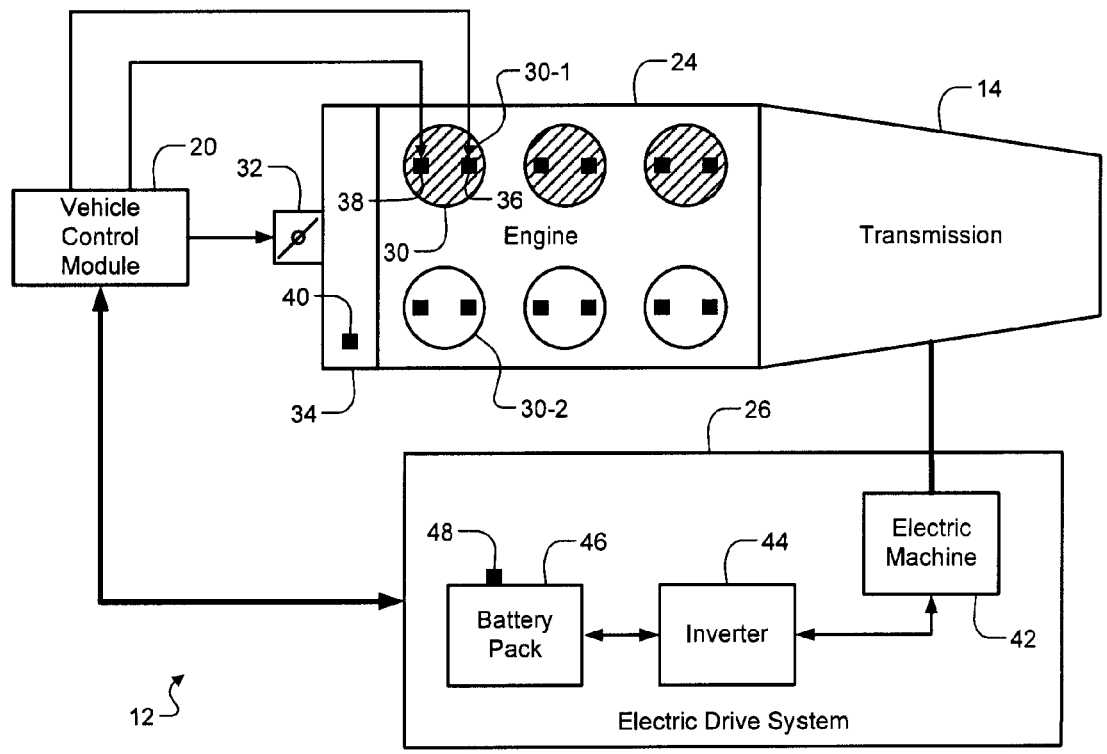
FIG. 2 is a functional block diagram further illustrating a portion of the hybrid vehicle shown in FIG. 1.

With particular reference to FIG. 2, the vehicle 10 may use a parallel drivetrain configuration. Accordingly, the powerplant 12 may include an IC engine 24 and an electric drive system 26, each drivingly coupled to the transmission 14. The IC engine 24 includes a plurality of cylinders 30 in which an air-fuel mixture is combusted to produce combustion drive torque that is transmitted to the transmission 14. Although FIG. 2 depicts six cylinders 30, the IC engine 24 may include additional or fewer cylinders 30 as may be desired.

During operation of the IC engine 24, intake air is drawn into the cylinders 30 via a throttle 32 and an intake manifold 34. Air drawn into the cylinders 30 mixes with fuel that may be provided by a plurality of fuel injectors 36. The air-fuel mixture is ignited by a plurality of spark plugs 38, thereby producing the combustion drive torque. The IC engine 24 may further include a plurality of sensors 40, such as a MAP sensor, that measure one or more operating parameters of the IC engine 24. The sensors may generate output signals that are communicated to the VCM 20.

The electric drive system 26 includes an electric machine 42 drivingly coupled to the transmission 14. The electric drive system 26 also includes an inverter 44 operably connecting the electric machine 42 and at least one battery pack 46. The electric drive system 26 may further include a plurality of sensors 48 that measure one or more operating parameters of the electric drive system 26, such as a state of charge of the battery pack 46. The sensors 48 may generate output signals that are communicated to the VCM 20.

The electric machine 42 may function as either a motor to propel the vehicle 10 or as a generator to charge the battery pack 46. The electric machine 42 may be of any suitable type such as, but is not limited to, a DC machine, synchronous machine, or a switched reluctance machine. In a motoring mode, the electric machine 42 functions as a motor that produces an electric drive torque that is transmitted to the transmission 14 while receiving power from the battery pack 46 via the inverter 44. In a regenerating mode, the electric machine 42 functions as a generator that charges the battery pack 46 via the inverter 44 while being driven by the transmission 14. The battery pack 46 may be a rechargeable battery that stores energy during the regenerating mode and supplies energy during the motoring mode. The battery pack 46 may be of any suitable type such as, but not limited to, a lead acid battery, lithium ion battery, and lithium polymer battery.

With continued reference to FIG. 2, the VCM 20 may regulate the combustion drive torque produced by the IC engine 24 by regulating actuators of the engine, such as the throttle 32, fuel injectors 36, and spark plugs 38. The VCM 20 may command the electric drive system 26 to operate in one of the motoring mode and the regenerating mode and may regulate the electric drive torque produced by the electric drive system 26 in the motoring mode.

The VCM 20 may further include an AFM system that selectively deactivates one or more cylinders 30 of the IC engine 24. In one exemplary embodiment, the AFM system may deactivate N/2 cylinders 30 in the deactivated mode, where N is equal to the total number of cylinders 30. For example only, in the deactivated mode of a six cylinder engine, three cylinders 30-1 may be active and three cylinders 30-2 may be inactive while the IC engine 24 is operated in the deactivated mode as shown in FIG. 2.

Prior to deactivating one or more cylinders 30 of the IC engine 24, the VCM 20 may selectively adjust the combustion drive torque produced by the IC engine 24 and the electric drive torque produced by the electric drive system 26 as will be described in further detail below. In this manner, the VCM 20 may reduce the undesirable torque disturbances that may otherwise occur during deactivation transitions.

Figure 3:
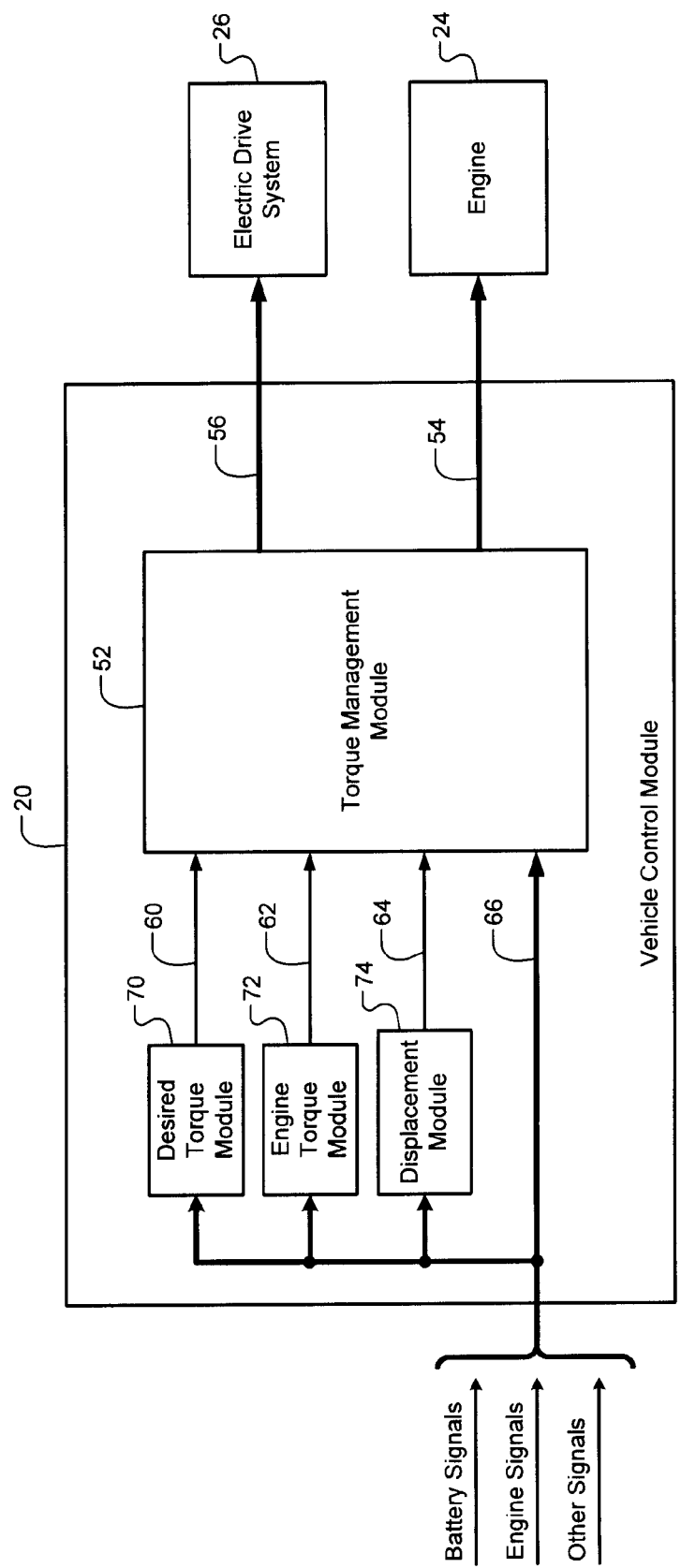
FIG. 3 is a functional block diagram illustrating the torque management system included with the vehicle control module shown in FIG. 1.

With particular reference to FIG. 3, an exemplary embodiment of the VCM 20 is shown. The VCM 20 includes a torque management (TM) module 52 that generates engine command signals 54 and electric drive system (EDS) command signals 56. The TM module 52 generates the engine command signals 54 and the EDS command signals 56 to regulate the combustion drive torque and the electric drive torque produced by the IC engine 24 and the electric drive system 26, respectively.

Figure 4:
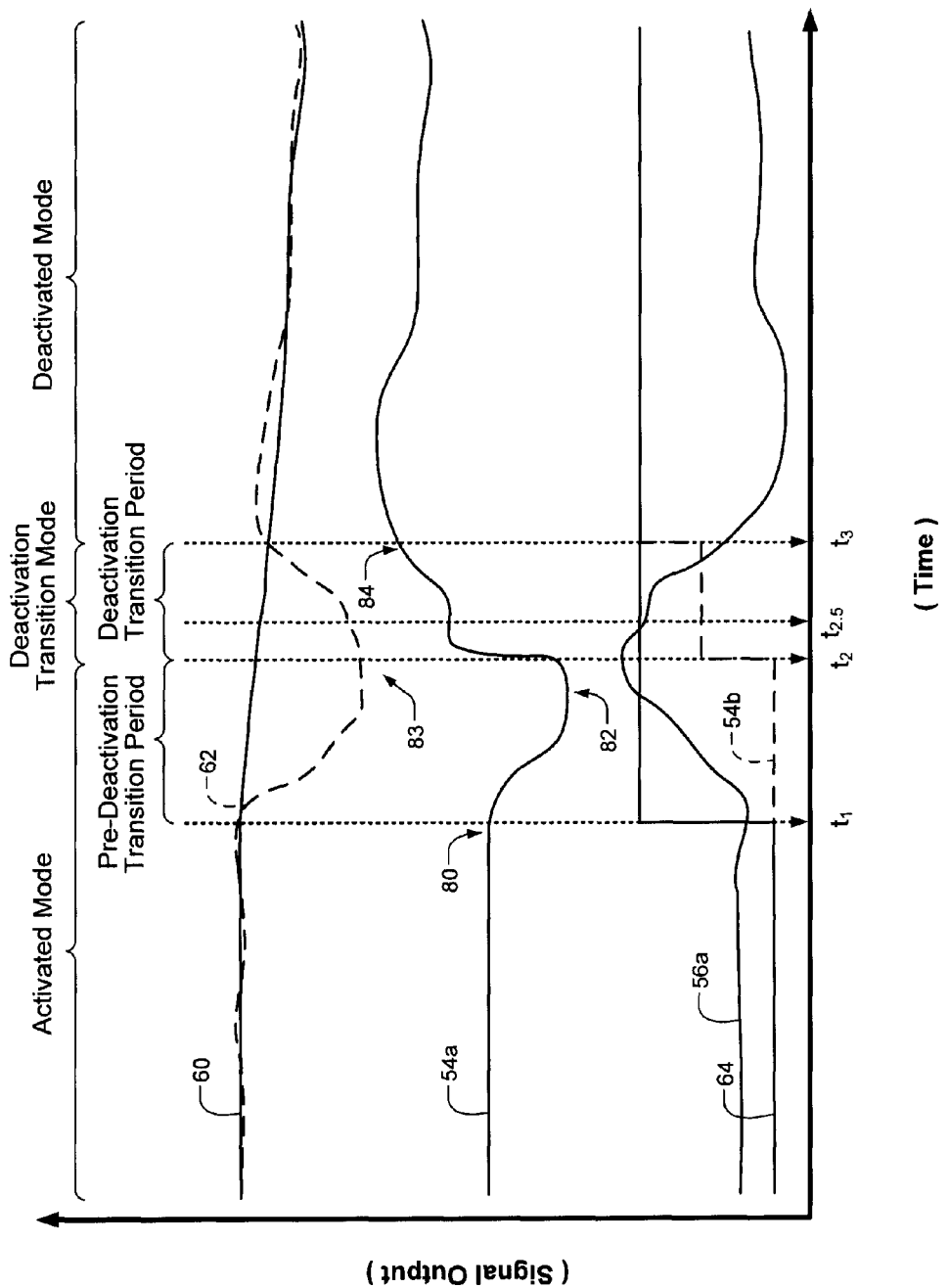
FIG. 4 is a graph illustrating the general operation of the vehicle control module shown in FIG. 1 according to the principles of the present disclosure.

The engine command signals 54 may include a MAP command signal 54$a$ and an AFM mode command signal 54$b$ (see FIG. 4). The MAP command signal 54$a$ may regulate a MAP of the IC engine 24. In an exemplary embodiment, the MAP command signal 54$a$ may regulate the throttle 32. The AFM mode command signal 54$b$ may command the IC engine 24 to operate in one of the AFM modes. The EDS command signals 56 may include a battery command signal 56$a$ (see FIG. 4) that regulates the energy supplied by the battery pack 46 in the motoring mode.

The TM module 52 may generate the engine and EDS command signals 54, 56 based on a desired drive torque 60, a combustion drive torque 62, an AFM mode request 64, and other vehicle signals 66. The other vehicle signals 66 may include, but are not limited to, the signals generated by the engine sensors 40, the electronic drive system sensors 48, and the driver interface devices 22. Thus, the other vehicle signals may include battery signals indicating one or more operating parameters of the battery pack 46 (e.g., state of charge) and engine signals indicating one or more operating parameters of the IC engine 24 (e.g., manifold air pressure) as shown.

The VCM 20 may further include a desired torque module 70 that determines the desired drive torque 60 based on the signals generated by the driver interface devices 22. The VCM 20 may include an engine torque module 72 that determines the combustion drive torque 62 based on a measured air-flow rate of intake air, an air-fuel ratio and/or other operating parameters of the IC engine 24. The VCM 20 may include a displacement module 74 that generates the AFM mode request 64 to selectively request the IC engine 24 be operated in the activated mode, the deactivated mode, the deactivation transition mode, or the activation transition mode.

With particular reference to the graph shown in FIG. 4, operation of the VCM 20 to regulate the powerplant 12 and thereby reduce the torque disturbances during deactivation transitions into the deactivated mode will now be described. FIG. 4 is a graphical representation of exemplary signal outputs according to the principles of the present disclosure. FIG. 4 illustrates the desired drive torque 60, the combustion drive torque 62, and the AFM mode request 64 received by the VCM 20. FIG. 4 also depicts exemplary outputs for certain engine command signals 54 and EDS command signals 56 generated by the VCM 20. Specifically, FIG. 4 illustrates exemplary signal outputs for the MAP command signal 54$a$ and the AFM mode command signal 54$b$ generated by the VCM 20. FIG. 4 also depicts the battery command signal 56$a$ generated by the VCM 20.

Operation of the VCM 20 will be described with reference to three primary timing references $t_1$, $t_2$, and $t_3$ shown in FIG. 4. Reference $t_1$ refers to a time when the displacement module 74 has generated the AFM mode request 64 to request the IC engine 24 be operated in a deactivated mode, but the TM module 52 has not yet commanded the IC engine 24 to operate in the deactivated mode. Reference $t_2$ refers to a time shortly after time $t_1$ when the TM module 52, in response to the AFM mode request 64, has enabled deactivation and commanded the IC engine 24 to begin a deactivation transition. Reference $t_3$ refers to a time shortly after time $t_2$ when the IC engine 24 completes the deactivation transition and begins operating in the deactivated mode. Deactivation of the desired cylinders may be completed between time $t_2$ and a time $t_{2.5}$ as shown.

Accordingly, it will be appreciated that the TM module 52 generates the AFM mode command signal 54$b$ to command the IC engine 24 to operate in an activated mode prior to time $t_1$ and in a deactivated mode after time $t_3$ as shown in FIG. 4. It will also be appreciated that during the time period $t_2$ to $t_3$, the TM module 52 generates the AFM mode command signal 54$b$ to command the IC engine 24 to operate in a deactivation transition mode.

With the foregoing in mind, prior to time $t_1$, the TM module 52 generates the engine command signals 54 and the EDS command signals 56 such that a sum of the combustion drive torque 62 produced by the IC engine 24 and the electric drive torque produced by the electric drive system 26 is equal to the desired drive torque 60 in the activated mode. For simplicity, the graph in FIG. 4 illustrates operation of the powerplant 12 such that prior to time $t_1$, the combustion drive torque 62 produced by the IC engine 24 is nearly equal to the desired drive torque 60 and the electric drive torque produced by the electric drive system 26 is nearly equal to zero.

Beginning at time $t_1$ and ending at time $t_2$, the TM module 52 generates the MAP command signal 54a to decrease the MAP corresponding to the desired drive torque 60 in the activated mode indicated at reference numeral 80 to a target MAP value ($MAP_{Target}$) indicated at reference numeral 82. By decreasing the MAP to the target MAP value, the TM module 52 reduces the combustion drive torque 62 produced by the IC engine 24 as shown. In this manner, the TM module 52 may reduce the combustion drive torque 62 to a target torque value indicated at reference numeral 83.

Beginning at time $t_1$ and ending at time $t_2$, the TM module 52 also generates the battery command signal 56a such that the sum of the combustion drive torque 62 produced by the IC engine 24 and the electric drive torque produced by the electric drive system 26 remains equal to the desired drive torque 60 in the activated mode. In this manner, the TM module 52 may smoothly reduce the combustion drive torque 62 produced by the IC engine 24 during the time period between $t_1$ and $t_2$ while maintaining the desired drive torque 60.

Beginning at time $t_2$, the TM module 52 generates the MAP command signal 54a to increase the MAP from the target MAP value, $MAP_{Target}$, to a desired MAP value indicated at reference numeral 84 corresponding to an estimated combustion drive torque value in the deactivated mode. For simplicity, the estimated combustion drive torque value in the deactivated mode may be equal to the desired drive torque 60 in the deactivated mode. Such equality may be desired when, for example, the electric drive system 26 will not immediately be operated in the deactivated mode to provide electric drive torque. Between time $t_2$ and time $t_{2.5}$, the TM module 52 may generate the MAP command signal 54a to maintain the combustion drive torque 62 at the target torque value. Beginning at time $t_{2.5}$, the TM module 52 may increase the MAP to increase the combustion drive torque 62 from the target torque value to the desired drive torque 60 in the deactivated mode.

Beginning at time $t_2$, the TM module 52 also generates the EDS command signals 56 such that the sum of the combustion drive torque 62 produced by the IC engine 24 and the electric drive torque produced by the electric drive system 26 is equal to the desired drive torque 60 in the deactivation transition mode. In this manner, the TM module 52 may smoothly increase the combustion drive torque 62 produced by the IC engine 24 during the deactivation transition period between $t_2$ and $t_3$ until the desired combustion drive torque in the deactivated mode is achieved.

Beginning at time $t_3$, the TM module 52 generates the engine and EDS command signals 54, 56 such that the sum of the combustion drive torque 62 produced by the IC engine 24 and the electric drive torque produced by the electric drive system 26 is equal to the desired drive torque 60 in the deactivated mode. For example, the TM module 52 may generate the MAP command signal 54a such that the combustion drive torque 62 produced by the IC engine 24 is equal to the desired drive torque 60 in the deactivated mode. Additionally, the TM module 52 may generate the battery command signal 56a to compensate for any difference between the combustion drive torque 62 and the desired drive torque 60. Accordingly, the TM module 52 may command the electric drive system 26 to produce electric drive torque or absorb combustion drive torque as may be desired.

From the foregoing, it will be appreciated that the VCM 20 may reduce torque disturbances during an impending deactivation transition by decreasing the combustion drive torque 62 prior to commanding the deactivation transition. While decreasing the combustion drive torque 62, the VCM 20 generates the engine and EDS command signals 54, 56 such that the sum of the combustion drive torque 62 and electric drive torque is equal to the desired drive torque 60. Subsequently, during the deactivation transition, the VCM 20 increases the combustion drive torque 62 to enable the IC engine 24 to achieve the desired combustion drive torque in the deactivated mode. During the deactivation transition, the VCM 20 generates the engine and EDS command signals 54, 56 such that the sum of the combustion drive torque 62 and the electric drive torque is equal to the desired drive torque 60.

Figure 5:
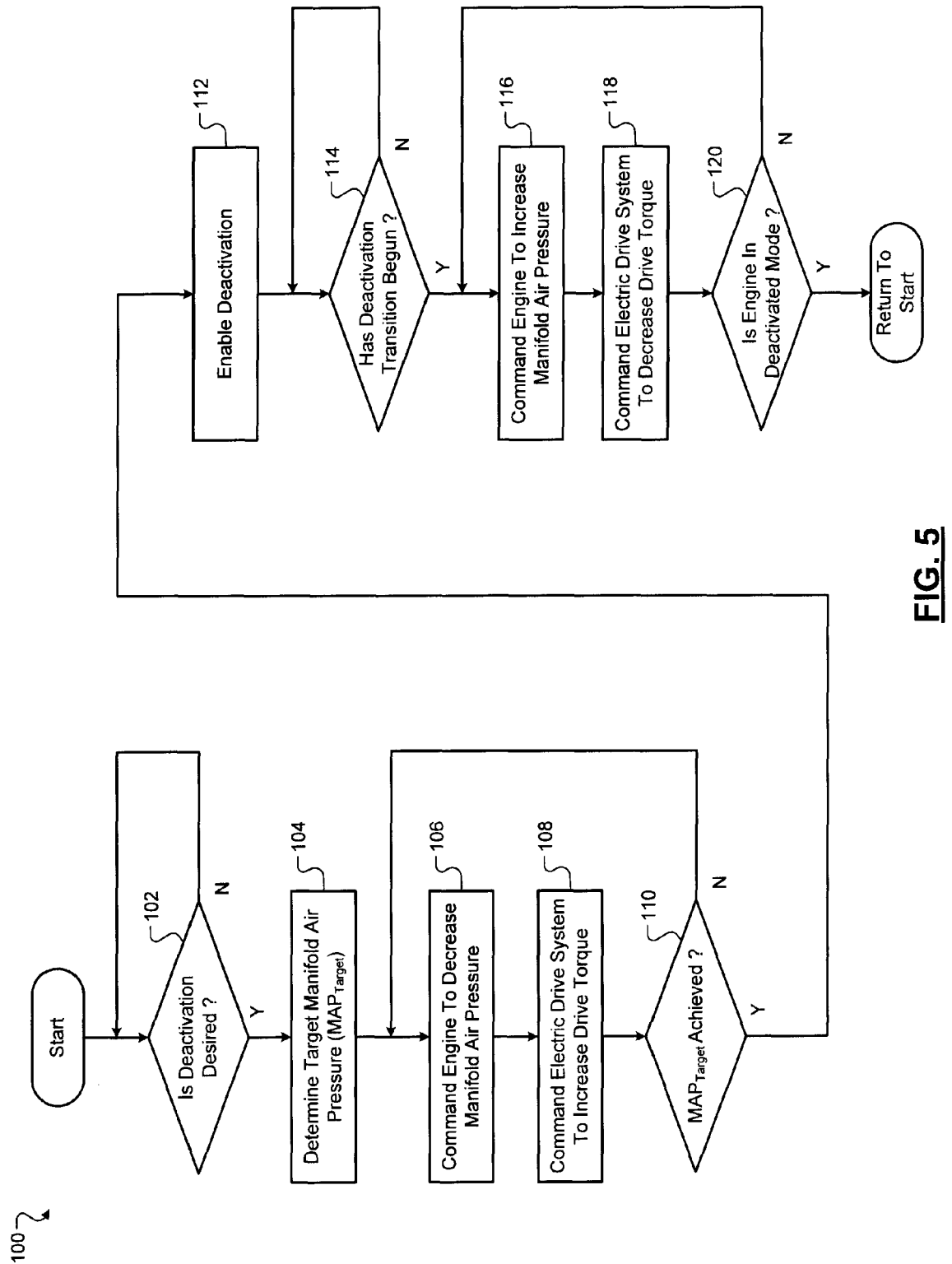
FIG. 5 is a flow diagram illustrating exemplary steps for controlling drive torque according to the principles of the present disclosure.

With particular reference to FIG. 5, an exemplary control method 100 for controlling the drive torque produced by the powerplant 12 according to the principles of the present disclosure is shown. The control method 100 may be implemented in one or more control modules included with the vehicle 10, such as the VCM 20. The control method 100 may be run at periodic time intervals corresponding to AFM control by the AFM system. Alternatively, the control method 100 may be run at a point in time when the AFM system (e.g., displacement module 74) requests a change in the mode of AFM operation.

The control method 100 begins in step 102 where control determines whether deactivation of one or more cylinders 30 in a deactivated mode is desired. If deactivation is desired, then control proceeds in step 104, otherwise control loops back as shown.

In step 104, control determines the target MAP value, $MAP_{Target}$. In general, the value of $MAP_{Target}$ will be less than a MAP value corresponding to a desired drive torque in the activated mode. The value of $MAP_{Target}$ may be based on a capability of the battery pack 46 to deliver energy to the electric machine 42. For example, the value of $MAP_{Target}$ may be based on an estimated electric drive torque that may be produced by the electric machine 42 in response to the energy available from the battery pack 46. Accordingly, the value of $MAP_{Target}$ may be based on a current state of charge and a temperature of the battery pack 46.

Additionally, the value of $MAP_{Target}$ may be based on other operating parameters of the vehicle 10, such as a current vehicle speed and an estimated combustion drive torque in the deactivated mode. For example only, where the current vehicle speed and the estimated combustion drive torque are low, the value of $MAP_{Target}$ may be equal to the MAP value corresponding to the desired drive torque. As another example, the value of $MAP_{Target}$ may be based on an estimated maximum combustion torque in the deactivated mode. The value of $MAP_{Target}$ may correspond to a combustion drive torque value lower than the estimated maximum combustion torque by a predetermined torque difference. Thus, the value of $MAP_{Target}$ may be based on, but is not limited to, MAP values corresponding to the desired combustion drive torque in the activated mode, the estimated combustion drive torque in the deactivated mode, and the estimated maximum combustion torque in the deactivated mode.

Control proceeds in steps 106 and 108 where control reduces the MAP of the IC engine 24 while increasing the electric drive torque produced by the electric drive system 26. In steps 106, 108, control commands the IC engine 24 and the electric drive system 26 such that the sum of the combustion drive torque produced by the IC engine 24 and the electric drive torque produced by the electric drive system 26 is equal to the desired drive torque in the activated mode.

With the foregoing in mind, in step 106 control commands the IC engine 24 to reduce the MAP to the target MAP value, $MAP_{Target}$. While commanding the IC engine 24 to reduce the MAP, control generates other control commands (e.g., fuel, spark) to the IC engine 24 to ensure smooth operation of the IC engine 24. In this manner, control may smoothly reduce the combustion drive torque produced by the IC engine 24 while decreasing the MAP. Control may use control loop feedback to reduce the MAP to $MAP_{Target}$. For example, control may use feedback that includes a measured MAP and an actual combustion drive torque produced by the IC engine 24.

In step 108, control commands the electric drive system 26 to produce electric drive torque to compensate for the reduced combustion drive torque produced by the IC engine 24 as a result of the decreased manifold air pressures commanded in step 106. More specifically, control commands the electric drive system 26 such that a sum of the combustion drive torque and the electric drive torque is equal to the desired drive torque in the activated mode.

In step 110, control determines whether the target MAP value has been achieved. If $MAP_{Target}$ has been achieved, then control proceeds in step 112, otherwise control loops back as shown.

In step 112, control enables deactivation. In step 114, control determines whether a deactivation transition has begun. If deactivation in a deactivation transition mode has begun, control continues in steps 116 and 118, otherwise control loops back as shown.

In steps 116 and 118, control increases the MAP of the IC engine 24 while decreasing the electric drive torque produced by the electric drive system 26. In steps 116 and 118, control commands the IC engine 24 and the electric drive system 26 such that the sum of the combustion drive torque produced by the IC engine 24 and the electric drive torque produced by the electric drive system 26 smoothly reaches a desired drive torque in the deactivated mode.

With the foregoing in mind, in step 116, control commands the IC engine 24 to increase the MAP from the target MAP value to a desired MAP value corresponding to the desired combustion drive torque in the deactivated mode. Control may use control loop feedback to increase the MAP.

In step 118, control commands the electric drive system 26 to reduce electric drive torque to compensate for the increased combustion drive torque produced by the IC engine 24 as a result of the increasing manifold air pressures commanded in step 116. More specifically, control commands the electric drive system 26 such that the sum of the combustion drive torque produced by the IC engine 24 and the electric drive torque produced by the electric drive system 26 is equal to a desired drive torque during the deactivation transition mode.

Control proceeds in step 120 where control determines whether the deactivation transition is complete and the IC engine 24 is operating in the deactivated mode. If the IC engine 24 is operating in the deactivated mode, control in the current control loop ends and control returns to the start to begin another control loop. If the deactivation transition is not complete, control loops back as shown.

In the foregoing manner, the control method 100 may reduce torque disturbances during an impending deactivation transition by decreasing the MAP prior to commanding the deactivation transition. In this manner, the control method 100 may reduce the combustion drive torque produced by the IC engine 24 at the onset of operation in the deactivation transition mode. The control method 100 increases MAP during the deactivation transition and thereby enables the IC engine 24 to achieve the desired combustion drive torque in the deactivated mode. While decreasing and increasing the MAP in the foregoing manner, the control method 100 regulates the electric drive torque produced by the electric drive system 26 such that the sum of the combustion drive torque and the electric drive torque is equal to the desired drive torque of the powerplant 12.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A control system for a hybrid powerplant comprising:
an input that receives a pre-transition signal; and
a torque management module that, prior to a deactivation transition period, selectively adjusts a combustion torque of an engine of said powerplant between a first torque value and a second torque value based on said pre-transition signal,
wherein at least one cylinder of said engine is transitioned from activated to deactivated during said deactivation transition period, and
wherein said second torque value is less than said first torque value.

2. The control system of claim 1 wherein said torque management module adjusts said combustion torque to said second torque value.

3. The control system of claim 1 wherein said second torque value is based on one of said first torque value and an estimated combustion torque of said engine in a deactivated mode.

4. The control system of claim 3 wherein said estimated combustion torque is one of a desired torque and a maximum torque of said engine in said deactivated mode.

5. The control system of claim 1 wherein said torque management module selectively adjusts a manifold pressure of said engine between a first manifold absolute pressure (MAP) value corresponding to said first torque value and a second MAP value corresponding to said second torque value.

6. The control system of claim 1, wherein said torque management module selectively adjusts an electric drive torque of an electric machine of said powerplant prior to said deactivation transition period based on said pre-transition signal.

7. The control system of claim 6 further comprising a displacement module that generates said pre-transition signal based on a desired drive torque of said powerplant.

8. The control system of claim of claim 6 wherein during a pre-transition period prior to said deactivation transition period, said torque management module adjusts said electric drive torque such that a sum of said combustion torque and said electric drive torque is equal to a desired drive torque of said powerplant.

9. The control system of claim 8 wherein during said deactivation transition period, said torque management module selectively increases said combustion torque and adjusts said electric drive torque such that said sum is equal to said desired drive torque.

10. The control system of claim 6 wherein said torque management module selectively adjusts power supplied to said electric machine by a battery and said second torque value is based on one of a stored energy of said battery and a temperature of said battery.

11. A control method for a hybrid powerplant comprising:
receiving a pre-transition signal; and,
prior to a deactivation transition period, selectively adjusting a combustion torque of an engine of said powerplant between a first torque value and a second torque value based on said pre-transition signal,
wherein at least one cylinder of said engine is transitioned from activated to deactivated during said deactivation transition period, and
wherein said second torque value is less than said first torque value.

12. The method of claim 11 wherein said selectively adjusting includes adjusting said combustion torque to said second torque value.

13. The method of claim 11 wherein said second torque value is based on one of said first torque value and an estimated combustion torque of said engine in a deactivated mode.

14. The method of claim 13 wherein said estimated combustion torque is one of a desired torque value and a maximum torque value of said engine in said deactivated mode.

15. The method of claim 11 wherein said selectively adjusting includes adjusting a manifold pressure of said engine between a first manifold absolute pressure (MAP) value corresponding to said first torque value and a second MAP value corresponding to said second torque value.

16. The method of claim 11 further comprising selectively adjusting an electric drive torque of an electric machine of said powerplant prior to said deactivation transition period based on said pre-transition signal and said combustion torque.

17. The method claim 16 further comprising generating said pre-transition signal based on a desired drive torque of said powerplant.

18. The method of claim of claim 16 wherein said selectively adjusting said electric drive torque includes adjusting said electric drive torque such that a sum of said combustion torque and said electric drive torque is equal to a desired drive torque of said powerplant during a pre-transition period prior to said deactivation transition period.

19. The method of claim 18 further comprising:
selectively increasing said combustion torque during said deactivation transition period; and
adjusting said electric drive torque during said deactivation transition period such that said sum is equal to said desired drive torque.

20. The method of claim 16 wherein said selectively adjusting said electric drive torque includes selectively adjusting power supplied to said electric machine by a battery, and said second torque value is based on one of a stored energy of said battery and a temperature of said battery.

* * * * *